Sept. 23, 1958        J. LUCHESE        2,853,389
BONED, STUFFED FOWL AND METHOD OF PREPARING SAME
Filed April 19, 1957        2 Sheets-Sheet 1
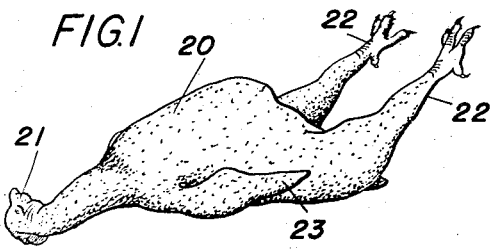
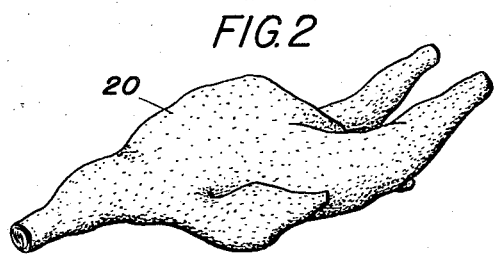
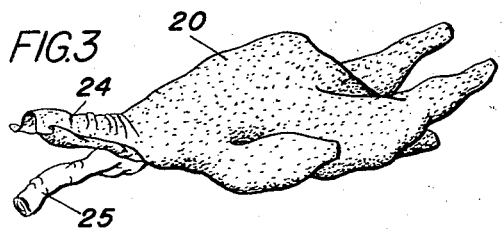
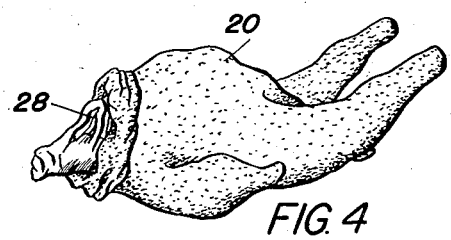
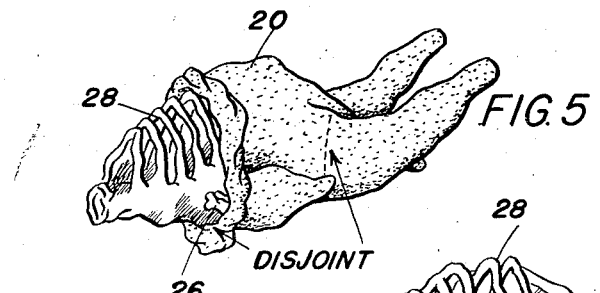
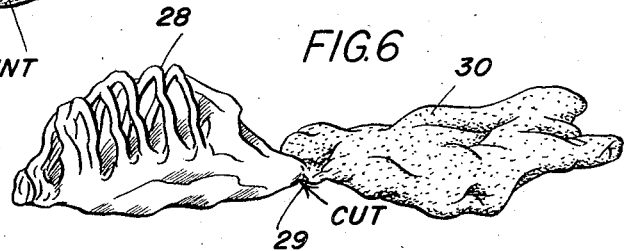
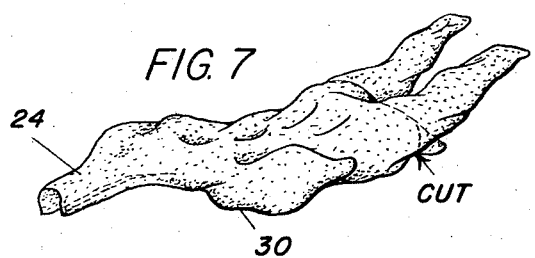
INVENTOR
JACK LUCHESE
BY *Ben Cohen*
       ATTORNEY Sept. 23, 1958    J. LUCHESE    2,853,389
BONED, STUFFED FOWL AND METHOD OF PREPARING SAME
Filed April 19, 1957    2 Sheets-Sheet 2
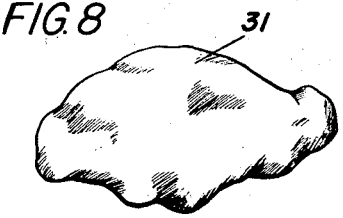
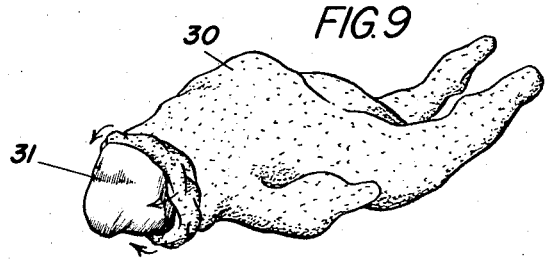
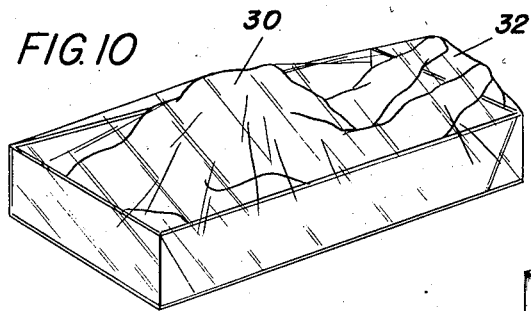
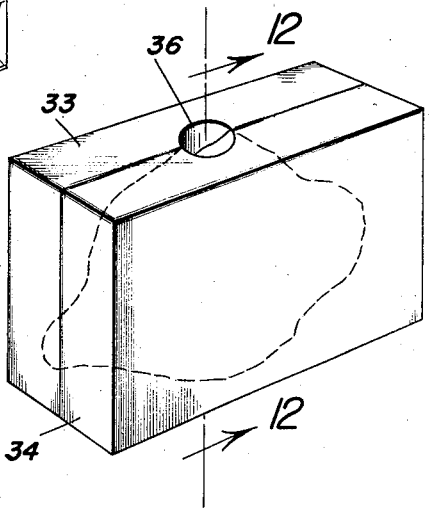
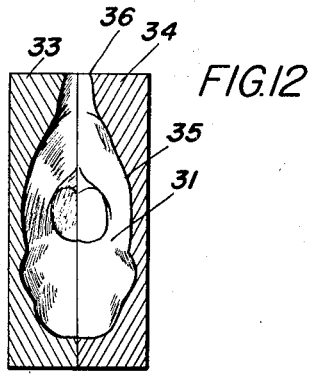
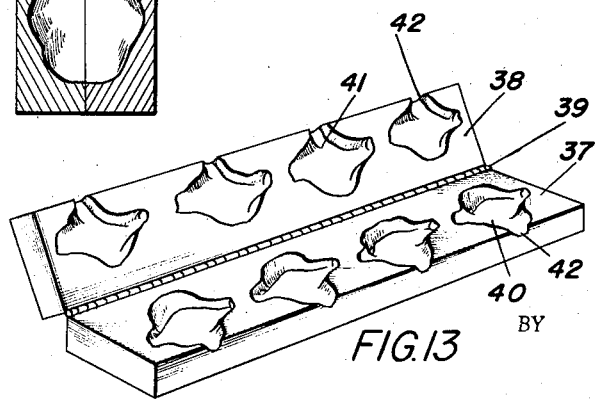
INVENTOR
JACK LUCHESE
BY
ATTORNEY

United States Patent Office

2,853,389
Patented Sept. 23, 1958

2,853,389

BONED, STUFFED FOWL AND METHOD OF PREPARING SAME

Jack Luchese, Lincoln Park, N. J., assignor of fifty percent to Sidney J. Meyers, Totawa Borough, N. J.

Application April 19, 1957, Serial No. 653,808

3 Claims. (Cl. 99—107)

This invention relates to a method of preparing poultry and other edible fowl for human consumption. More specifically, the invention relates to boneless stuffed chicken and to an improved method of preparing same.

It has previously been proposed to bone turkey or other fowl by making certain incisions at various points in the body of the fowl, after which by the use of a boning knife, the meat is progressively removed from the bones and skeleton part of the fowl, the meat being turned inside out as it is cut from the bones, and finally after removing the same over the head of the fowl, the meat and skin is reversed to its original condition with the skeleton removed.

In the above and other instances of preparing boned fowl, the primary purpose has been to prepare a boneless fowl which can be formed into a roast or can be packed in cans for easy final preparation and consumption.

The present invention contemplates a novel method of boning a fowl by completely removing the skin and meat from the bones without making any incisions in the carcass of the fowl other than a single slit in the neck of the fowl and thereafter stuffing the fowl in a novel manner to produce a stuffed boneless fowl having no unsightly incisions therein and which resembles a dressed fowl with the bones intact.

Thus, a primary object of the present invention is to provide a novel method of boning fowls.

A further object of the invention is to provide a novel method of stuffing a boneless fowl.

A still further object of the invention is to provide a stuffed, boneless fowl that is pleasing in appearance and which can be prepared for consumption with a minimum of effort.

Other objects and advantages of the invention will be apparent from the following specification taken in conjunction with the accompanying drawings illustrating the various steps of accomplishing the present invention.

Figure 1 is a perspective view of a fowl with the feathers removed.

Figure 2 is a similar view with the head, feet and wing tips removed.

Figure 3 is a similar view showing the neck skin split preparatory to the first stripping operation.

Figure 4 shows the fowl with the skin and meat folded back over the breast.

Figure 5 shows the fowl preparatory to disjointing the wing bones.

Figure 6 shows the step of separating the flesh from the skeleton.

Figure 7 shows the flesh folded inside in.

Figure 8 is a perspective view of the stuffing molded into the shape of the fowl.

Figure 9 discloses a step in the process of inserting the stuffing into the boned fowl.

Figure 10 is a view of the finished fowl in package form for marketing.

Figure 11 is a perspective view of the mold for preparing the stuffing.

Figure 12 is a vertical sectional view taken on the line 12—12 of Figure 11.

Figure 13 is a perspective view of a multiple mold in open position.

Referring to the drawings in detail, Figure 1 discloses a fowl commonly known as a "New York Dressed" chicken which designates a chicken with only the feathers removed. The chickens most commonly used in the present invention is approximately two and a quarter pounds in weight. The chicken is indicated by numeral 20, the head by numeral 21, the feet by numeral 22 and the wing tips by numeral 23.

The first step in the present invention is to remove the head, feet and wing tips of the plucked chicken as shown in Figure 2. The neck skin 24 is then split straight down the back as shown in Figure 3 and this exposes the wind pipe 25, which together with the crop are removed. The skin is then folded back over the breast as seen in Figure 4 and the meat is scraped from the breast bone and the wish bone is removed. The wing bones are disjointed from the breast bone at 26 and the meat is scraped free of the wing bones and the wing bones removed. The breast bone is then crushed with the palm of the hand and the flesh is folded back over the breast bone. The leg bones are then disjointed at the hip joint and the thigh bones are removed by scraping the meat free from the shin bones. The flesh is then folded back to the vent and the meat is cut from the skeleton 28 as seen at 29 in Figure 6. In this step, the poultry consisting of flesh and skin and indicated by numeral 30 is now completely inside out. The poultry 30 is now turned inside in and the musk or oil sacks are removed. The boned poultry is now ready for the stuffing step.

The stuffing may be of any type and the novel feature is the shape thereof prior to the stuffing of the poultry. The stuffing is prepared in special molds and as seen in Figures 11 and 12, the mold comprises two complementary sections 33 and 34, the interiors of which are suitably cut out to form a recess 35 in the shape of the skeleton of the chicken to be stuffed minus the neck, feet and wing tip bones. An opening 36 is provided in the top walls of the mold sections for filling the interior of the mold sections with the stuffing. The mold is preferably formed of German Silver but may be made of aluminum or the like.

While there is shown a single mold in Figures 11 and 12, a multiple mold such as shown in Figure 13 may be used. In this form, the mold sections 37 and 38 are hinged at 39 with the cavity sections indicated by numerals 40 and 41 and the filling opening by numeral 42. While four cavity sections have been shown in this modification, it will be obvious that a mold having many more cavities may be employed.

Referring to Figure 8, the finished molded stuffing is indicated by numeral 31. It is prepared by placing the prepared stuffing in the molds and then quick freezing or chilling the stuffing whereby it assumes the shape shown in Figure 8. After it is frozen or chilled, the molded stuffing is inserted into the boned poultry through the neck opening as shown in Figure 9, and the skin from the neck is then folded over to seal the poultry. The temperature of the stuffing when inserted into the poultry should be the same temperature of the poultry to retard the possibility of spoilage before quick freezing the stuffed poultry. The preferred temperature of the stuffing is 33 degrees Fahrenheit. Prior to the stuffing of the poultry, the boned fowl is dipped in a cold salt water solution to enhance the flavor of the boned, stuffed poultry when it is roasted. The stuffed poultry may be marketed by quick freezing the poultry and sealing it in suitable containers made of aluminum, plastic, cellophane or any combination thereof. As shown in Figure 10, the stuffed fowl is placed in an aluimnum roasting pan and sealed with a transparent plastic cover 32. If desired, a gravy cube may be included in the package.

It will thus be seen that I have devised a novel product and process for making the same and while the product and process have been described in rather specific detail, it will be understood that the method may be used for any type of fowl, and minor changes may be made without departing from the spirit of the invention as defined in the appended claims.

Having thus described the invention, what is claimed is:

1. The method of boning a fowl comprising forming an incision down the neck of the fowl, removing the wind pipe and crop, folding the skin back over the breast and scraping and removing the wish bone, disjointing the wing bones from the breast bone and scraping the meat free from the wing bones, separating the flesh from the breast bone, disjointing the leg bones at the hip joints and removing the thigh bones by scraping the meat free from the shin bones, folding the flesh back to the vent and then cutting the meat free from the skeleton.

2. A method for preparing a food product comprising the steps of boning a fowl, said steps comprising forming an incision down the neck of the fowl, removing the wind pipe and crop, folding the skin back over the breast and scraping and removing the wish bone, disjointing the wing bones from the breast bone and scraping the meat free from the wing bones, separating the flesh from the breast bone, disjointing the leg bones at the hip joints and removing the thigh bones by scraping the meat free from the shin bones, folding the flesh back to the vent and then cutting the meat free from the skeleton, shaping a stuffing in the form of the fowl and inserting the shaped stuffing into the boned fowl.

3. A fowl product as prepared by the method of claim 2.

References Cited in the file of this patent

UNITED STATES PATENTS

| | | |
|---|---|---|
| 1,433,628 | Knaust | Oct. 31, 1922 |
| 2,571,544 | Cutrera | Oct. 16, 1951 |
| 2,633,601 | Snyder | Apr. 7, 1953 |